Aug. 22, 1939.  E. J. VON HENKE  2,170,700
WELDING MACHINE TRANSFORMER
Filed Sept. 15, 1936   5 Sheets-Sheet 4
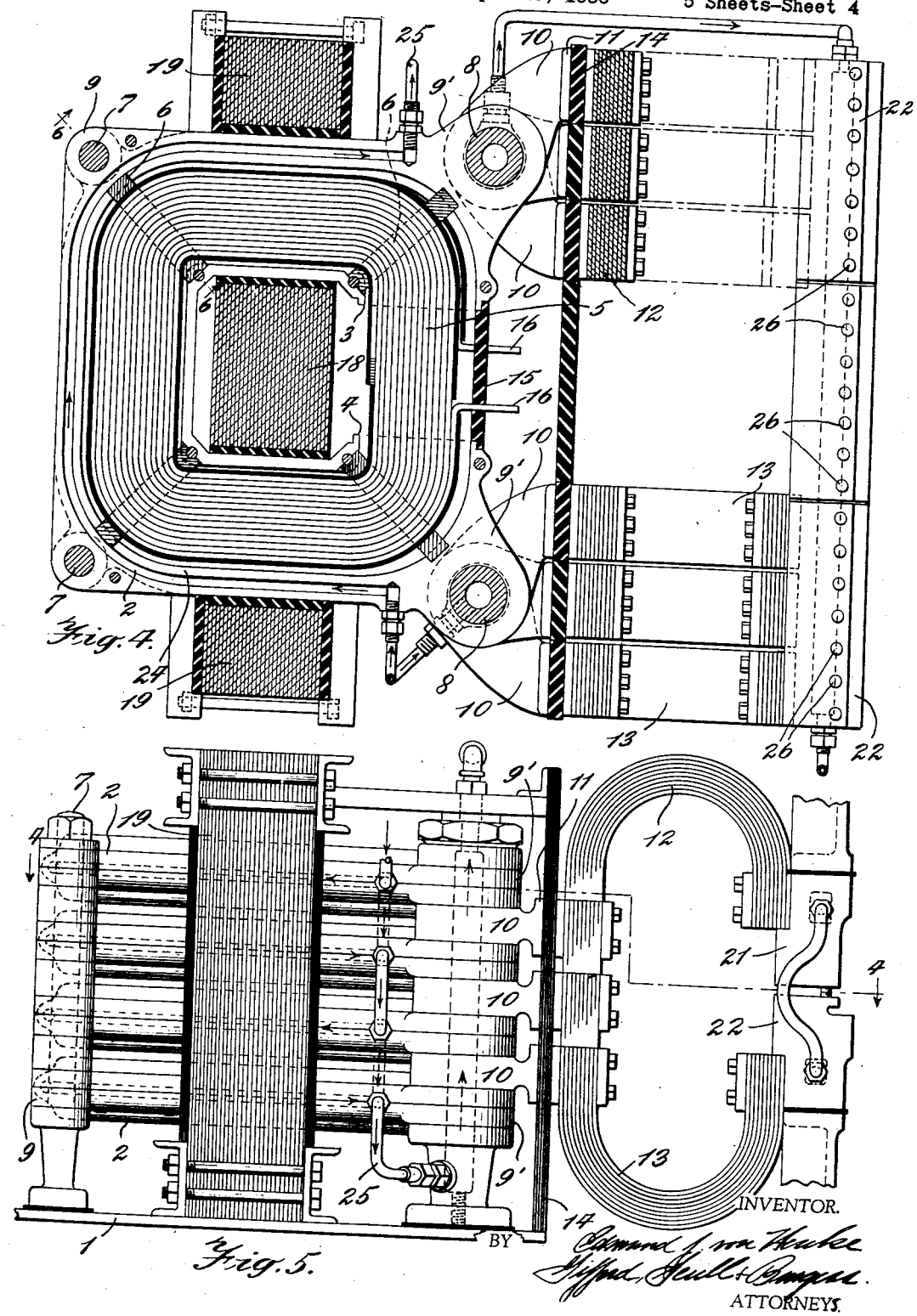
INVENTOR.
ATTORNEYS

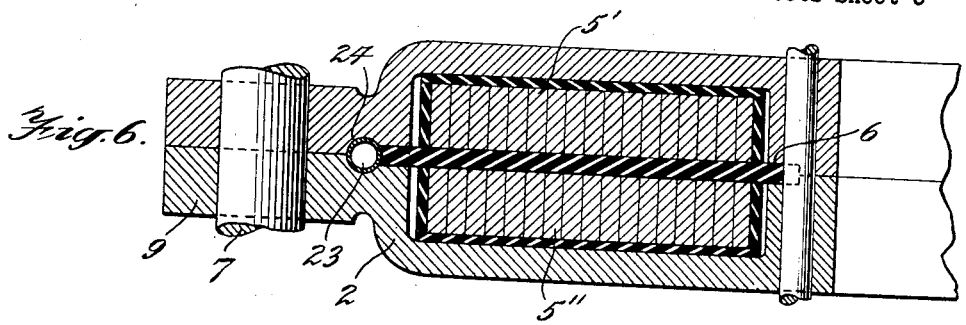
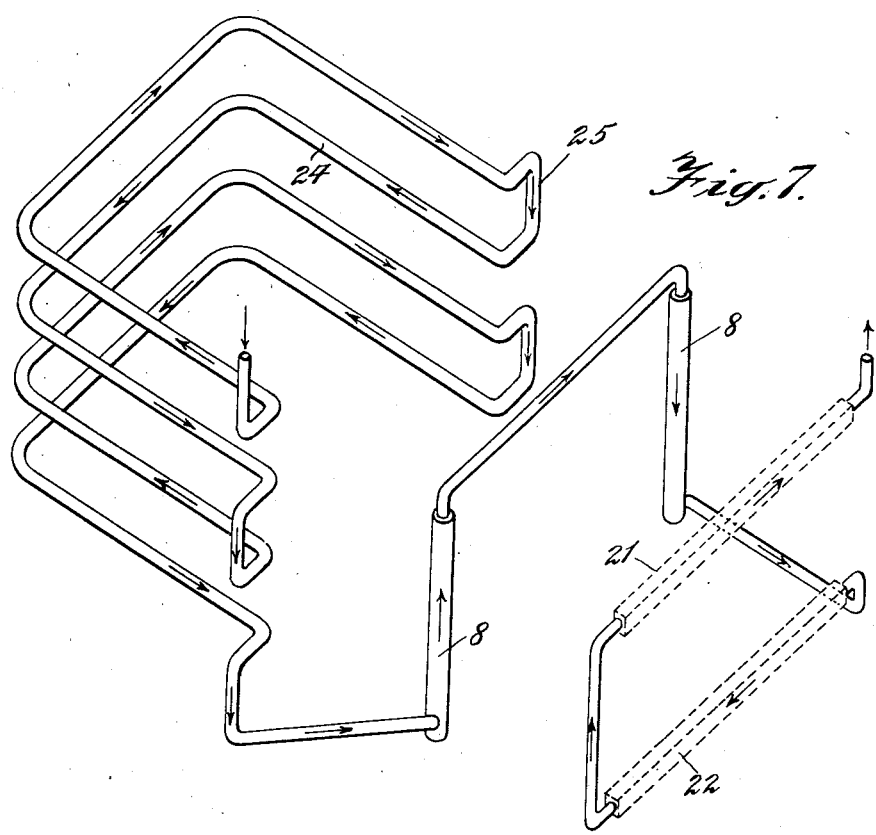

Patented Aug. 22, 1939

2,170,700

UNITED STATES PATENT OFFICE 2,170,700

WELDING MACHINE TRANSFORMER

Edmund J. von Henke, Chicago, Ill., assignor to American Electric Fusion Corporation, Chicago, Ill., a corporation of Illinois Application September 15, 1936, Serial No. 100,838

5 Claims. (Cl. 175—356)

This invention relates to a novel and improved form of welding machine transformer, the novel features of which will be best understood from the following description and the annexed drawings, in which I have shown a selected embodiment of the invention and in which:

Fig. 4 is a section approximately on the line 4—4 of Fig. 5;

Fig. 5 is an elevation of the structure appearing in Fig. 4;

Fig. 6 is a section approximately on the line 6—6 of Fig. 4;

Fig. 7 is a diagrammatic view showing the cooling system for the apparatus.

The machine selected for illustration is of the type often used for so-called "projection welding" wherein two plates or the like are to be welded together and wherein one plate is provided with a series of projections contacting with the other plate and then the two plates are welded by application of welding heat and pressure at the projections. The invention will be described as embodied in a machine of this type, although it can be used with other machines where found applicable.

Figure 1:
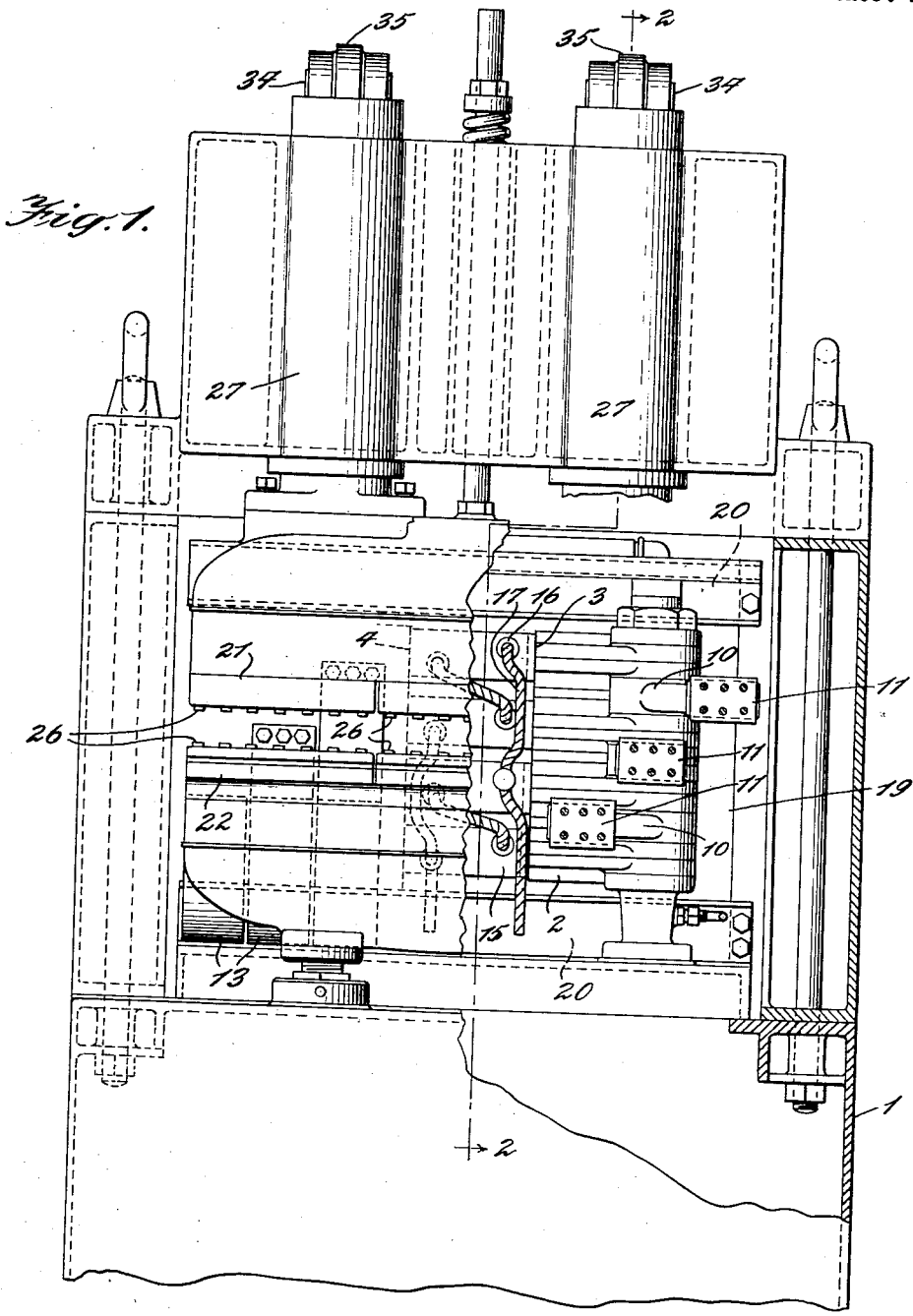
Fig. 1 is an elevation of the front of the machine selected for purposes of illustration, part thereof being broken away.

Referring first to Figs. 1, 4, and 5, the machine may comprise any suitable base 1 supporting a transformer, here shown as of a novel form and comprising a plurality of sections in the form of hollow rings 2. Each ring is shown as generally rectangular in shape, although any other shape of ring may be employed. Each hollow ring forms a secondary and is interrupted, having spaced ends 3 and 4 (Fig. 4). Within each hollow ring is disposed the winding of a primary 5 which, as shown in Fig. 6, may consist of two coils 5' and 5" separated at spaced intervals by a suitable separator 6.

For convenience of assembly, each hollow ring may be made in two parts, as also plainly shown in Fig. 6, and these parts may be assembled by being threaded on a plurality of posts 7 and 8 which may extend through aligned holes in ears 9 and 9' integral with the rings. It will also be seen that these two parts are substantial duplicates of each other, particularly in cross section, and are cup-shaped, with the edges of the cup walls coming together to form the space for the primary. That is to say, the two cups face each other. By this arrangement, particularly with the ears to receive the posts, it is possible to very quickly and readily build up a transformer of the desired size, as will be apparent to those skilled in the art.

The rings are of material which readily conducts the electric current, as will be readily understood by those in the art, and, for example, may be formed of copper castings with relatively thin walls. They are electrically connected together, which may be done, for example, by forming the posts of conductive material and also by inserting between the ears 9' conductor members 10 which are conveniently slid over the posts and which have on their outer ends plates or terminals 11 to which may be connected flexible conductors 12 and 13, respectively. It will be understood that the posts fit the openings in the ears 9' and in the members 10, closely enough to provide good electrical contact. The plates 11 may extend through an insulating wall 14, and the adjacent ends 3 and 4 of the ring sections of the secondary may be closed by insulating plates 15. The ends of the various primary windings may extend through these plates 15, as indicated in Fig. 4, wherein the ends 16 are shown extending outwardly through that plate. In Fig. 1, the ends are shown as being connected together by suitable conductors 17, by means of which the primaries may be joined in series or in parallel, as desired.

Associated with the secondaries and primaries is a core which comprises a part 18 extending through the ring-like sections and other parts 19 disposed on opposite sides of the sections and connected top and bottom at 20 so as to form a continuous magnetic circuit around each side of the transformer.

By the above arrangement, a transformer may be built up of any desired number of sections, possibly varying the core, if necessary, to accommodate the sections, and it will be seen that each section is a self-contained unit of secondary and primary, in which the secondary encloses the primary, thus protecting it from dust. Similarly, since the two secondaries are smooth, box-like structures, less damage from the collection of dust thereon will follow than if they were in the form of coils. The sections may be readily assembled by sliding on the posts, and the primaries may be connected as desired, either in series or in parallel, to get the desired results.

The members 10 may take the various forms shown, so that the plates 11 may be distributed across the face of the transformer, as indicated in Fig. 1. It will be seen that the spaced ends 3 and 4 of the sections are substantially in alignment or at least they form a continuous gap, and when the device is used for welding, all the members 10 on one side of the gap may be connected to one electrode, and all the members on the other side of the gap may be connected to the other electrode, these electrodes being exemplary of suitable terminals for the secondary. For that purpose, the members 10 may take the various forms shown, as noted above, thus getting a more uniform distribution of heat by conducting the current to various parts of the electrode. For example, referring to Fig. 5, it will be seen that one electrode 21 is connected to three members 10 on one side of the gap, whereas the other electrode 22 is connected to the other three members 10 on the other side of the gap and that the flexible conductors 12 carry current to a substantial extent into each electrode, thus giving a good distribution of heat.

In order to cool the machine, the two parts of each section may be provided with cavities which together make a duct 23 (Fig. 6) within which may be placed a copper tube 24 which may extend around at least three sides of the transformer, as best shown in Fig. 4. The various tubes of the different sections may be joined by outside connections 25 to form a system through which water, oil, or other cooling fluid may pass. As shown in Fig. 7, suitable connections may be used to include the electrodes 21 and 22 in the cooling system, and for that purpose the two posts 8 may be made hollow to form pipes comprising part of the system.

The two electrodes 21 and 22 may be provided with a number of electrode points 26 to perform the projection welding for which the apparatus is especially adapted, and the electrode 22 is connected as a relatively stationary one, whereas the electrode 21 is mounted for vertical movement in a guideway 27 in which it may be reciprocated by two toggles, each comprising an arm 28 pivoted to the electrode at 29. The other part of the toggle comprises an arm 30 pivoted to the arm 28 at 31 and bearing at 32 against the short arm 33 of a lever pivoted at 34 on the machine. The long arm 35 of the lever is urged upwardly by a relatively heavy compression spring 36 which may be adjustably supported on the arm 37 pivoted on the machine at 38.

Figure 2:
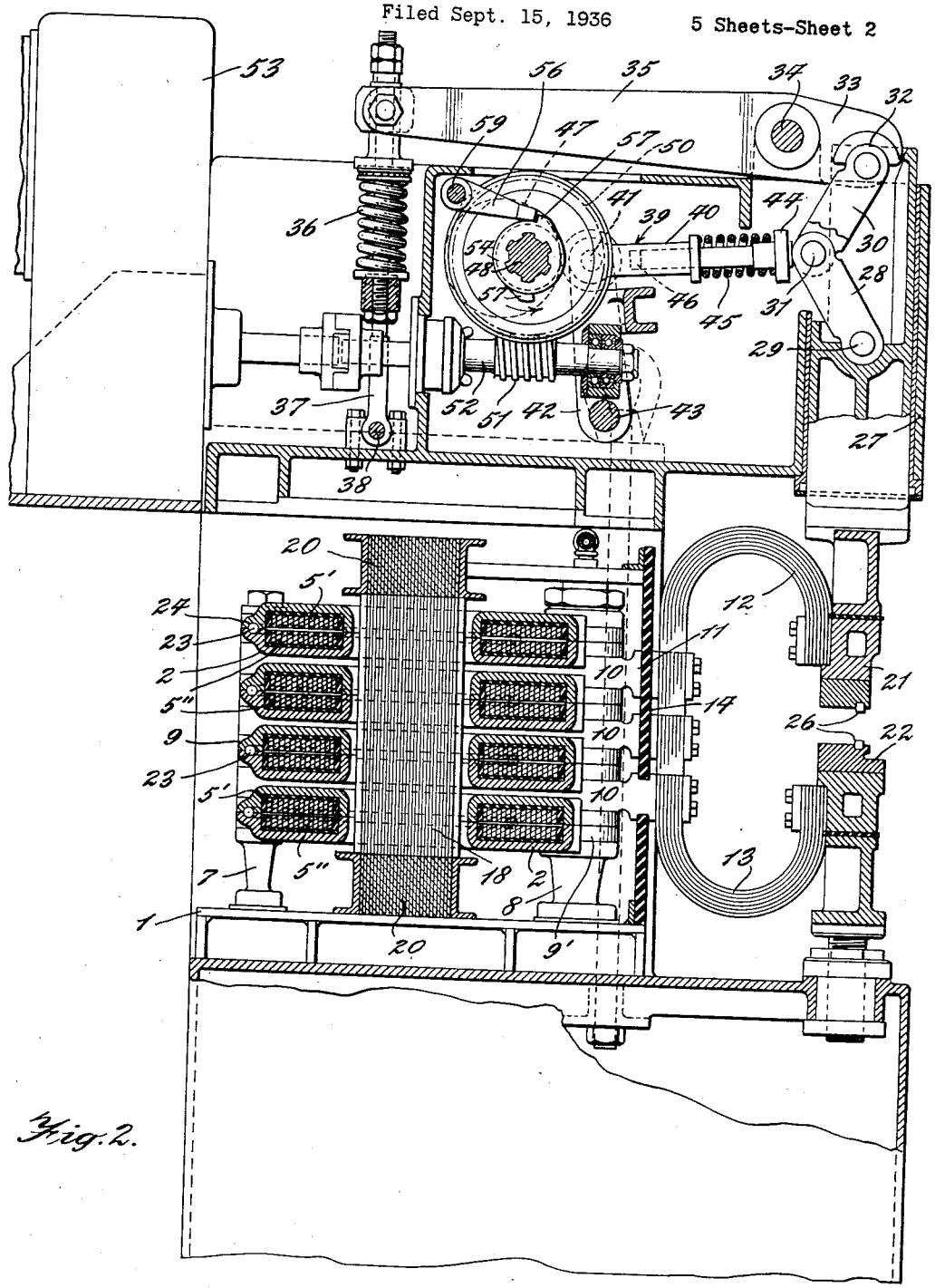
Fig. 2 is a section approximately on the line 2—2 of Fig. 1 and also of Fig. 3.

Each toggle may be operated by a link 39 formed in two parts, one of which is designated 40 and is pivoted at 41 to an arm 42 pivoted at 43 on the machine. The other part 44 is pivoted to the toggle at 31, and the two parts are normally urged away from each other by means of a relatively light spring 45. As indicated in Fig. 2, these two parts have telescopic engagement, and when in position shown in that figure, their ends are separated by the space 46.

Figure 3:
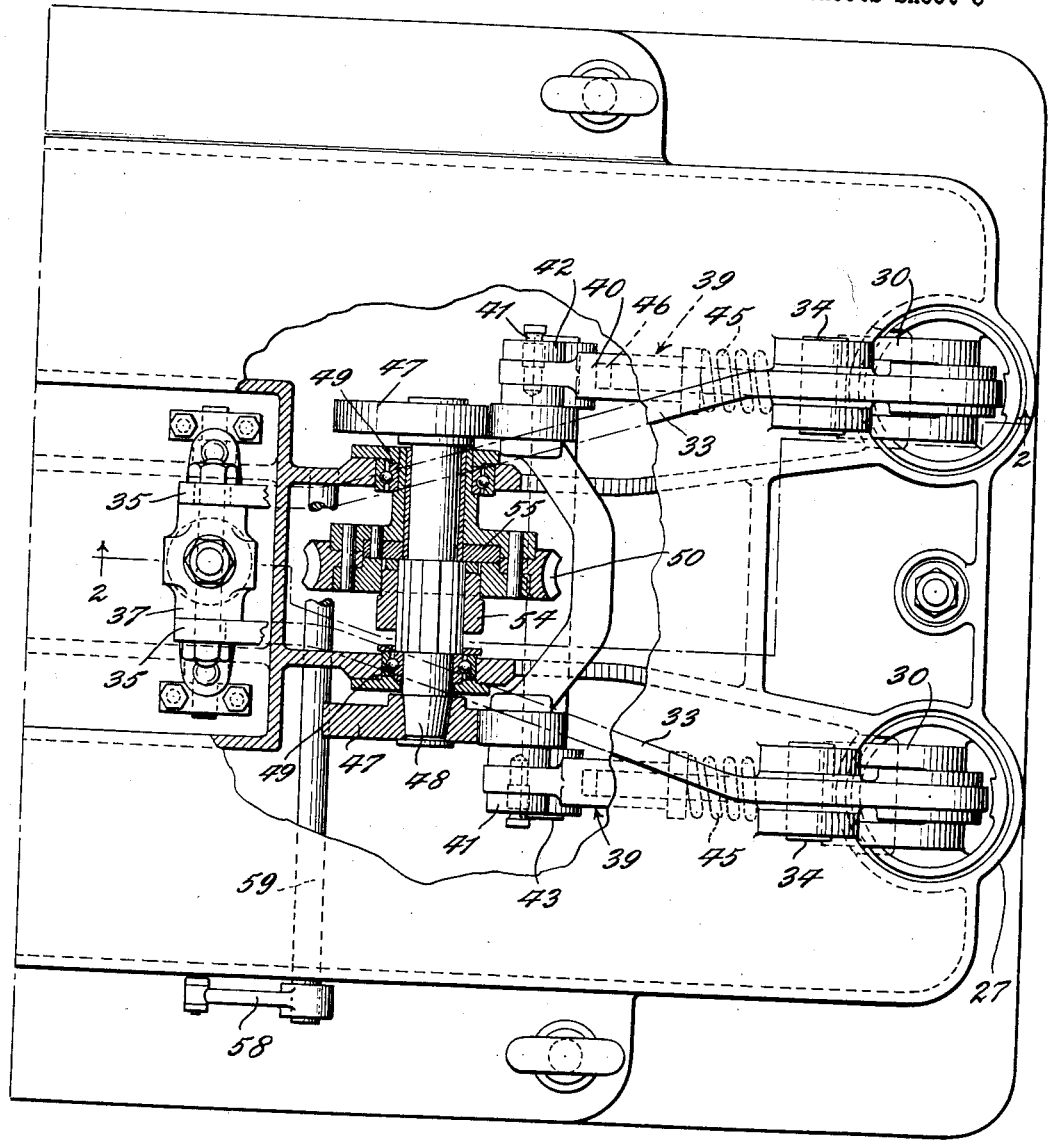
Fig. 3 is a plan view of the structure appearing in Figs. 1 and 2, parts being broken away and others shown in section.

The movable electrode may be operated by means of two such arrangements as those just described, it being seen from an inspection of Fig. 3 that the pivot 41 has a link 39 on either end thereof. This arrangement is desirable when a long electrode is to be operated, although it is to be understood that with a shorter electrode one such arrangement might be sufficient.

Referring more particularly to Fig. 3, it will be seen that the toggles may be operated by cams 47 secured on a shaft 48 and supported in suitable bearings 49 on the machine. Rotatably mounted on the shaft is a worm gear 50 meshing with a worm 51 on a shaft 52. This shaft may be operated from a motor 53 through suitable reduction gearing. The shaft 48 is splined to a friction clutch element 54 which may be driven from a clutch element 55 rotatable with the gear 50. The element 54 and consequently the shaft 48 may be held against rotation by means of a dog 56 pivoted on the machine and adapted to engage one of the two noses 57 on the member 54, the direction of rotation being indicated by the arrow in Fig. 2. The dog may be raised by means of a trip 58 rocking a shaft 59 to which the dog is secured.

In operation, assuming that work to be welded is disposed between the electrode points 26, the motor may be placed in operation and the result is that the gear 50 rotates at a relatively slow speed. So long as the dog 56 is in the position indicated in Fig. 2, no actuation of the movable electrode takes place, the clutch elements slipping, but when the dog is raised, which may be done by the trip, then the clutch elements will cause the shaft 48 to rotate. The result will be a sequence of operations, the first of which is actuation of the toggles under the action of the relatively light springs 45. This will be sufficient to cause a light contact between the work and the electrodes, or between the different parts of the work, resulting in a large electrical resistance at the points to be welded and consequently in the generation of a relatively large amount of heat for welding purposes.

The next thing that takes place is a compression of the springs 45 and a closing of the spaces 46 so that a continued operation of the toggles will take place by a positive engagement of the parts 40 and 44 of each link. This action takes place against the bearings 32 and is resisted by the relatively heavy spring 36 aided by the long lever arms 35. As the toggles straighten out, the spring 36 will be compressed and then will react to give a final squeezing pressure to the work, this resulting in a greatly improved welding operation.

While I have shown the invention as embodied in a specific form, it is to be understood that various changes in details may be made without departing from the scope of the invention, as defined by the appended claims.

I claim:

1. A transformer comprising a plurality of posts, a plurality of sections provided with holes adapted to receive said posts, whereby said sections may be assembled on said posts, each section comprising a secondary and a primary enclosed therein and being in the form of a ring, and a core having a part passing through the centers of said rings.

2. A transformer comprising a plurality of posts, a plurality of sections provided with holes adapted to receive said posts, whereby said sections may be assembled on said posts, each section comprising a secondary in the form of a hollow interrupted ring with spaced ends and a primary within the hollow ring, said spaced ends forming a continuous gap and two of said posts being disposed on opposite sides of said gap, and conductor members disposed on said two posts between sections and in electrical contact therewith.

3. A transformer comprising a plurality of posts, a plurality of sections provided with holes adapted to receive said posts, whereby said sections may be assembled on said posts, each section comprising a secondary in the form of a hollow interrupted ring with spaced ends and a primary within the hollow ring, said spaced ends forming a continuous gap and two of said posts being disposed on opposite sides of said gap, conductor members disposed on said two posts between sections and in electrical contact therewith, and a terminal connected to all of said members on one of said two posts.

4. A transformer comprising a plurality of posts, a plurality of sections provided with holes adapted to receive said posts, whereby said sections may be assembled on said posts, each section comprising a secondary and a primary enclosed therein and being in the form of a ring, a core having a part passing through the centers of said rings, each secondary comprising two cup-shaped parts facing each other and defining a hollow space to receive a primary, said parts having matching cavities defining a duct, and tubes extending through the ducts of the several secondaries and connected together.

5. A transformer comprising a plurality of posts, a plurality of sections provided with holes adapted to receive said posts, whereby said sections may be assembled on said posts, each section comprising a secondary in the form of a hollow interrupted ring with spaced ends and a primary within the hollow ring, said spaced ends forming a continuous gap and two of said posts being disposed on opposite sides of said gap, conductor members disposed on said two posts between sections and in electrical contact therewith, and terminals on said conductor members, with the terminals on one side of the gap disposed at different distances from the gap, whereby connections from said ends to a terminal extending transversely of the gap may be disposed parallel to each other.

EDMUND J. von HENKE.